United States Patent
Sun et al.

(10) Patent No.: US 9,145,326 B2
(45) Date of Patent: Sep. 29, 2015

(54) ROTARY SEAL CHUCK OF OPTICAL FIBER PREFORM ROD DEPOSITION LATHE

(75) Inventors: Jianhua Sun, Hubei (CN); Tao Liu, Hubei (CN); Shengya Long, Hubei (CN); Runhan Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 88 days.

(21) Appl. No.: 14/117,139

(22) PCT Filed: Mar. 13, 2012

(86) PCT No.: PCT/CN2012/072222
§ 371 (c)(1),
(2), (4) Date: Nov. 12, 2013

(87) PCT Pub. No.: WO2013/000292
PCT Pub. Date: Jan. 3, 2013

(65) Prior Publication Data
US 2014/0312579 A1  Oct. 23, 2014

(30) Foreign Application Priority Data
Jun. 29, 2011 (CN) .......................... 2011 1 0178833

(51) Int. Cl.
*B23B 31/00* (2006.01)
*C03B 37/018* (2006.01)

(52) U.S. Cl.
CPC ... *C03B 37/01884* (2013.01); *Y10T 279/17384* (2015.01)

(58) Field of Classification Search
CPC  B23B 31/1223; B23B 31/1276; B23B 31/26; B23B 31/262; B23B 31/266; Y10T 82/26; Y10T 82/262; Y10T 82/266
See application file for complete search history.

(56) References Cited

U.S. PATENT DOCUMENTS 2,783,401 A * 2/1957 Foster et al. ................... 310/104
2,812,185 A * 11/1957 Snell .............................. 279/128

(Continued)

FOREIGN PATENT DOCUMENTS

CN 1401599 A 3/2003
CN 1934041 A 3/2007

(Continued)

OTHER PUBLICATIONS

State Intellectual Property Office of the People's Republic of China, "Office Action", China, Mar. 6, 2013.
State Intellectual Property Office of the People's Republic of China, "Office Action", China, Sep. 5, 2012.
State Intellectual Property Office of the People's Republic of China, "International Search Report", China, Jun. 21, 2012.

*Primary Examiner* — Will Fridie, Jr.
(74) *Attorney, Agent, or Firm* — Locke Lord LLP; Tim Tingkang Xia, Esq.

(57) ABSTRACT

The invention relates to a rotary seal chuck of an optical fiber preform rod deposition lathe, comprising a fixed socket sleeve and a rotary shaft. The fixed socket sleeve is provided with a central hole base. The central hole base bears the rotary shaft through a bearing. An end of the central hole base is connected to an air hose. The rotary shaft is a hollow rotary shaft provided with a through hole. One end of the through hole communicates with the air hose, and the other end of the through hole is provided with a liner tube connecting sealing hole base. A magnetic fluid seal ring is disposed at a joint between an inner side of the rotary shaft and the central hole base of the fixed socket sleeve, to form a rotary dynamic seal. An outer side of the rotary shaft is connected to a rotary driving disk.

10 Claims, 1 Drawing Sheet

(56) References Cited

U.S. PATENT DOCUMENTS 2,824,745 A * 2/1958 Ruth et al. .................. 279/118
3,299,819 A * 1/1967 McCoy ........................ 417/420
4,135,863 A * 1/1979 Davis et al. ................. 417/420

FOREIGN PATENT DOCUMENTS

| | | |
|---|---|---|
| CN | 102276144 A | 12/2011 |
| CN | 202107632 A | 1/2012 |
| JP | 62230642 A | 10/1987 |

* cited by examiner

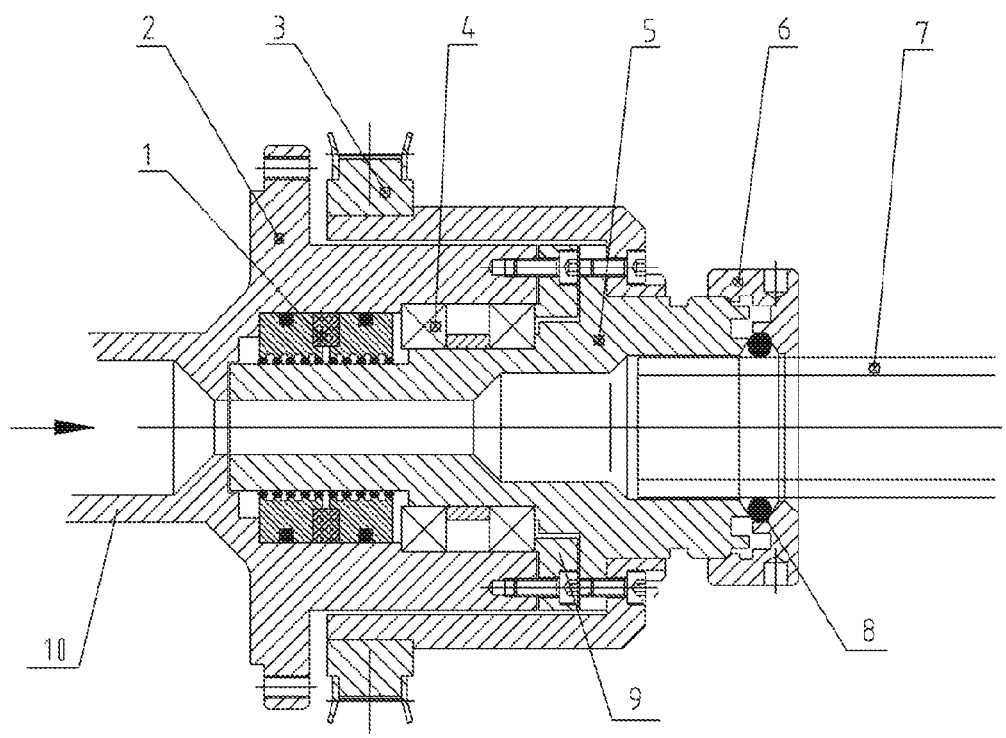

ROTARY SEAL CHUCK OF OPTICAL FIBER PREFORM ROD DEPOSITION LATHE

FIELD OF THE INVENTION

The present invention relates generally to a deposition lathe for manufacturing an optical fiber perform rod by using a plasma chemical vapor deposition (PCVD) method, and more particularly, to a rotary seal chuck deposed at a gas intake end of the deposition lathe.

BACKGROUND OF THE INVENTION

PCVD machining of an optical fiber preform rod is implemented through an optical fiber preform rod deposition lathe, and the PCVD machining process is performing plasma chemical vapor deposition inside a pure silica glass liner, and during the deposition, the pure silica glass liner is sealed and clamped by rotary seal chucks at two ends thereof; the rotary seal chuck seals the rotary seal chuck itself and two ends of the glass liner while clamping the glass liner and rotating at a constant speed, so that chemical gas participating the deposition flows from one end of the glass liner to the other end in sealed state, and the inner pressure in the liner is kept to avoid the leakage of the chemical gas and entrance of the external gas, thereby ensuring the quality of the deposition machining of the optical fiber preform rod. The dynamic seal performance of the rotary seal chuck is critical here. A dynamic seal part of a conventional rotary seal chuck is a rubber seal ring structure, which has the following defects during use: first, in order to ensure the seal performance, a linear contact area of the rubber seal ring must ensure an enough amount of compression, and a contact area of the inner ring and outer ring of the rubber ring and a rotation shaft as well as a fixed shaft must be large enough, so that not only great rotation friction is generated, but also the rubber part is inevitably worn, and therefore, the seal performance of the rubber seal ring is deteriorated after being used for a period of time, and the service life of the whole chuck device is short; second, sweeps generated by wearing of the rubber seal ring fall into an inner hole of the rotation shaft and is fixed to the chemical gas to contaminate the inner cavity of the glass liner, thereby affecting the deposition quality of the glass liner, which may cause an inferior work piece or even scrap when being serious.

Therefore, a heretofore unaddressed need exists in the art to address the aforementioned deficiencies and inadequacies.

SUMMARY OF THE INVENTION

One of the objectives of the present invention is to provide a rotary seal chuck for an optical fiber preform rod deposition lathe, which solves the defects of the prior art, and has desired seal performance, long service life, no contamination, and capability of being used in PCVD machining.

In one aspect of the invention, the rotary seal chuck includes a fixing seating and a rotation shaft, the fixing seating is provided with a center hole seat, the center hole seat supports a rotation shaft through a bearing, one end of the center hole seat is connected to an air pipe, the rotation shaft is a hollow rotation shaft provided with a through hole, one end of the through hole is communicated with the air pipe, the other end of the through hole is provided with a liner pipe seal connection hole seat, a magnetic fluid sealing ring is disposed at the junction of the inner side of the rotation shaft and the center hole seat of the fixing seating so as to form rotation dynamic seal, and the outside of the rotation shaft is connected to a rotation driving disc.

In one embodiment, the bearing is a rolling bearing, and two rolling bearings are disposed in the center hole seat in parallel at an interval in the front and back respectively.

In one embodiment, a fixed flange is disposed at the outside of the rotation shaft, and the rotation shaft is connected to the rotation driving disc through the fixed flange.

In one embodiment, an end cover is disposed at the outer end of the rotation shaft, a rubber seal ring is disposed between the inner side of the end cover and a port of the through hole so as to form the liner pipe seal connection hole seat.

In one embodiment, the axial width of the magnetic fluid sealing ring is 28-32 mm.

In one embodiment, an annular cooling water jacket is disposed at the periphery of the center hole seat near the magnetic fluid sealing ring, and the cooling water jacket is connected to a cooling water circulation device through a water inlet and a water outlet.

The present invention has, among other things, the following advantages: (1). A magnetic fluid rotary sealing ring adopted not only has desired seal performance, but also has a significantly reduced rotation friction moment under the same seal level. Practices show that, the rotation start torque of the present invention is only about ⅓ of that of a rotary seal chuck of the rubber seal ring. (2). The performance in service is stable and the effective service life is long, the effective service life of the magnetic fluid rotary seal chuck is several times that of the rubber ring rotary seal chuck, and therefore, the operation and maintenance costs of equipment are reduced. (3). Because the precision of the gap size between the rotation shaft and a hole seat of the magnetic fluid seal device is far lower than the precision of the gap size between the rotation shaft and a hole seat in the rubber seal ring device, the precision requirement on manufacturing equipment parts is reduced greatly, so that the manufacturing cost of the equipment is reduced. (4). The magnetic fluid rotary seal device has high cleanliness during use, does not generate any sweeps, ensures the purity of the chemical gas input during the deposition machining, and improves the quality of the chemical vapor deposition of the glass liner, thereby improving the machining precision and quality of the optical fiber preform rod. (5). The fixed hole seat is provided with the annular cooling water jacket, so as to reduce the working temperature of the whole rotary seal chuck, thereby eliminating undesired effects of the inherit high temperature of the deposition lathe on the magnetic fluid component.

These and other aspects of the present invention will become apparent from the following description of the preferred embodiment taken in conjunction with the following drawings, although variations and modifications therein may be affected without departing from the spirit and scope of the novel concepts of the invention

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a cross-sectional front view of a rotary seal chuck according to one embodiment according to the present invention.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail in conjunction with the accompanying drawings. Referring to the drawings, like numbers indicate like components throughout the views.

In accordance with the purposes of this invention, as embodied and broadly described herein, this invention, in one aspect, relates to a rotary seal chuck deposed at a gas intake end of the deposition lathe.

Referring to FIG. 1, the rotary seal chuck includes a fixing seating 2 connected to a deposition lathe working table, the fixing seating is provided with a center hole seat, and the front end of the center hole seat supports a rotation shaft 5 through a bearing 4, where the bearing is a rolling bearing with a model number of 1080907, and two bearings are disposed in the center hole seat in parallel at an interval. A stop end cover 9 is disposed at the front end of the center hole seat, so as to stop and position the bearing. The rear end and the center hole seat is connected to an air pipe 10, and the air pipe is an intake air pipe. The rotation shaft 5 is a hollow rotation shaft provided with an axial through hole, one end of the through hole is located at the rear end of the center hole seat and is communicated with the air pipe, and the other end of the through hole is provided with a liner pipe seal connection hole seat. The liner pipe seal connection hole seat includes an end cover 6 disposed at the outer end of the rotation shaft, and a rubber seal ring 8 is disposed between the inner side of the end cover and a through hole port of the rotation shaft, so as to form the liner pipe seal connection hole seat for fitting and clamping a glass liner 7. A magnetic fluid sealing ring 1 is disposed between the inner side (rear end) of the rotation shaft and the center hole seat of the fixing seating near the air pipe, the magnetic fluid forms a series of liquid "O" shaped seal ring between the outer ring of the rotation shaft and the center hole seat, fills the seal gap to achieve the effect of seal, so as to form rotation dynamic seal between the rotation shaft and the fixing seating. A fixed flange is disposed at the periphery of the front part of the rotation shaft, and the rotation shaft is connected to a shell-like rotation driving disc 3, and the rotation driving disc is connected to a drive device through a belt pulley at one side of the rotation driving disc. An annular cooling water jacket may be disposed at the periphery of the center hole seat of the fixing seating near the magnetic fluid sealing ring, and the cooling water jacket is connected to a cooling water circulation device through a water inlet and a water outlet. Moreover, in order to improve the corrosion resistance of the chuck, a nickel-plated layer or gold-plated layer is coated at surfaces of the rotation shaft and the center hole seat of the fixing seating that contact with the chemical gas. This embodiment is mainly applicable to the rotary seal chuck at the gas intake end of the deposition lathe.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A rotary seal chuck of an optical fiber preform rod deposition lathe, comprising:
    a fixing seating; and
    a rotation shaft,
    wherein the fixing seating is provided with a center hole seat, wherein the center hole seat supports the rotation shaft through a bearing, and one end of the center hole seat is connected to an air pipe;
    wherein the rotation shaft comprises a hollow rotation shaft provided with a through hole, wherein one end of the through hole is communicated with the air pipe, and the other end of the through hole is provided with a liner pipe seal connection hole seat;
    wherein a magnetic fluid sealing ring is disposed at the junction of the inner side of the rotation shaft and the center hole seat of the fixing seating so as to form rotation dynamic seal, and the outside of the rotation shaft is connected to a rotation driving disc; and
    wherein a fixed flange is disposed at the outside of the rotation shaft, and the rotation shaft is connected to the rotation driving disc through the fixed flange.

2. The rotary seal chuck according to claim 1, wherein the bearing is a rolling bearing, and two rolling bearings are disposed in the center hole seat in parallel at an interval in the front and back respectively.

3. A rotary seal chuck of an optical fiber preform rod deposition lathe, comprising:
    a fixing seating; and
    a rotation shaft,
    wherein the fixing seating is provided with a center hole seat, wherein the center hole seat supports the rotation shaft through a bearing, and one end of the center hole seat is connected to an air pipe;
    wherein the rotation shaft comprises a hollow rotation shaft provided with a through hole, wherein one end of the through hole is communicated with the air pipe, and the other end of the through hole is provided with a liner pipe seal connection hole seat;
    wherein a magnetic fluid sealing ring is disposed at the junction of the inner side of the rotation shaft and the center hole seat of the fixing seating so as to form rotation dynamic seal, and the outside of the rotation shaft is connected to a rotation driving disc; and
    wherein an end cover is disposed at the outer end of the rotation shaft, a rubber seal ring is disposed between the inner side of the end cover and a port of the through hole so as to form the liner pipe seal connection hole seat.

4. The rotary seal chuck according to claim 1, wherein the axial width of the magnetic fluid sealing ring is in a range of 28-32 mm.

5. The rotary seal chuck according to claim 1, a nickel-plated layer or gold-plated layer is coated on surfaces of the rotation shaft and the center hole seat of the fixing seating that contact chemical gas.

6. The rotary seal chuck according to claim 1, wherein an annular cooling water jacket is disposed at the periphery of the center hole seat near the magnetic fluid sealing ring, and the cooling water jacket is connected to a cooling water circulation device through a water inlet and a water outlet.

7. A rotary seal chuck of an optical fiber preform rod deposition lathe, comprising:
    a fixing seating; and
    a rotation shaft, wherein the fixing seating is provided with a center hole seat, wherein the center hole seat supports the rotation shaft through a bearing, and one end of the center hole seat is connected to an air pipe;

wherein the rotation shaft comprises a hollow rotation shaft provided with a through hole, wherein one end of the through hole is communicated with the air pipe, and the other end of the through hole is provided with a liner pipe seal connection hole seat;

wherein a magnetic fluid sealing ring is disposed at the junction of the inner side of the rotation shaft and the center hole seat of the fixing seating so as to form rotation dynamic seal, and the outside of the rotation shaft is connected to a rotation driving disc;

wherein the bearing is a rolling bearing, and two rolling bearings are disposed in the center hole seat in parallel at an interval in the front and back respectively; and wherein an end cover is disposed at the outer end of the rotation shaft, a rubber seal ring is disposed between the inner side of the end cover and a port of the through hole so as to form the liner pipe seal connection hole seat.

8. The rotary seal chuck according to claim 7, wherein the axial width of the magnetic fluid sealing ring is in a range of 28-32 mm.

9. The rotary seal chuck according to claim 7, a nickel-plated layer or gold-plated layer is coated on surfaces of the rotation shaft and the center hole seat of the fixing seating that contact chemical gas.

10. The rotary seal chuck according to claim 7, wherein an annular cooling water jacket is disposed at the periphery of the center hole seat near the magnetic fluid sealing ring, and the cooling water jacket is connected to a cooling water circulation device through a water inlet and a water outlet.

* * * * *